US012707514B2

(12) United States Patent
Wan et al.

(10) Patent No.: US 12,707,514 B2
(45) Date of Patent: Aug. 11, 2026

(54) APPARATUSES, METHODS AND NON-TRANSITORY COMPUTER-READABLE STORAGE MEDIUMS FOR NETWORK ACCESS

(71) Applicant: Nokia Solutions and Networks Oy, Espoo (FI)

(72) Inventors: Kenneth Wan, Ottawa (CA); Killian De Smedt, Antwerp (BE); Sanjay Wadhwa, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 357 days.

(21) Appl. No.: 18/494,015

(22) Filed: Oct. 25, 2023

(65) Prior Publication Data

US 2025/0142649 A1 May 1, 2025

(51) Int. Cl.

*H04W 76/12* (2018.01)
*H04L 67/141* (2022.01)
*H04W 76/18* (2018.01)

(52) U.S. Cl.

CPC .......... *H04W 76/12* (2018.02); *H04L 67/141* (2013.01); *H04W 76/18* (2018.02)

(58) Field of Classification Search

CPC ..... H04W 76/12; H04W 76/18; H04W 76/19; H04W 76/27; H04W 88/14; H04L 67/141;

(Continued)

(56) References Cited

U.S. PATENT DOCUMENTS 11,445,525 B1 * 9/2022 Sawczuk .............. H04W 72/569
2016/0283304 A1 * 9/2016 Horikawa ........... G06F 11/3452

(Continued)

FOREIGN PATENT DOCUMENTS

CN 114554615 A 5/2022
CN 116390272 A 7/2023

OTHER PUBLICATIONS

Nokia et al: "MBS session restoration upon MB-UPF failure with restart", 3GPP Draft; C4-221489, 3rd Generation Partnership Project (3GPP), Mobile Competence Centre ; 650, Route Des Lucioles ; F-06921 Sophia-Antipolis Cedex; France, vol. CT WG4, Feb. 23, 2022 (Feb. 23, 2022).

(Continued)

*Primary Examiner* — Austin J Moreau
*Assistant Examiner* — Thao D Duong
(74) *Attorney, Agent, or Firm* — Harness, Dickey & Pierce, P.L.C.

(57) ABSTRACT

A system for configuring network access in a control and user plane separation architecture includes at least one processor and at least one memory storing instructions that, when executed by the processor, cause the system to send, by a session management function (SMF) to a first user plane function (UPF), a first packet forwarding control protocol (PFCP) message including an indication of a first tunnel internet protocol (IP) address and a designated state for the first UPF and send, by the SMF to a second UPF, a second PFCP message including the indication of the first tunnel IP address and a designated state for the second UPF, the designated state for the second UPF being standby and the designated state for the first UPF being active.

19 Claims, 5 Drawing Sheets

(58) Field of Classification Search
CPC ..... H04L 45/22; H04L 45/645; H04L 45/655; H04L 45/70; H04L 45/76; H04L 45/851; H04L 45/0377; H04L 69/40
See application file for complete search history.

(56) References Cited

U.S. PATENT DOCUMENTS

| | | | | |
|---|---|---|---|---|
| 2018/0199398 | A1* | 7/2018 | Dao | H04W 76/27 |
| 2020/0053165 | A1* | 2/2020 | Li | H04W 12/08 |
| 2022/0070757 | A1* | 3/2022 | He | H04L 45/28 |
| 2023/0156091 | A1 | 5/2023 | Poscic et al. | |
| 2025/0063017 | A1* | 2/2025 | Tang | H04W 76/10 |

OTHER PUBLICATIONS

Extended European Search Report Corresponding to Application No. 242034486, mailed Feb. 28, 2025.

3rd Generation Partnership Project; Technical Specification Group Services and System Aspects; System architecture for the 5G System (5GS); Stage 2 (Release 18). (2023). 3GPP, V18.3.0. http://www.3gpp.org.

* cited by examiner

APPARATUSES, METHODS AND NON-TRANSITORY COMPUTER-READABLE STORAGE MEDIUMS FOR NETWORK ACCESS

TECHNICAL FIELD

One or more example embodiments relate to methods, apparatuses, and/or non-transitory computer-readable storage mediums for providing network access.

BACKGROUND

Third Generation Partnership Project (3GPP) 5th generation (5G) technology is a next generation of radio systems and network architecture that can deliver extreme broadband and ultra-robust, low latency connectivity. 5G technology improves a variety of telecommunication services offered to end users and helps support massive broadband that delivers gigabytes of bandwidth per second on demand for both uplink and downlink transmissions.

A 5G network may support IP services, such as IP television (IPTV) services for a residential gateway (RG), such as a $5^{th}$ Generation-RG (5G-RG) served by the 5G Core (5GC).

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

A Broadband Network Gateway (BNG) is an access point through which network subscribers connect to a core network, such as a 5G Core (5GC). Control and User Plane Separation in Broadband Network Gateway (CUPS BNG) is an example of a disaggregated BNG. CUPS BNG is defined in Broadband Forum (BBF) Technical Report TR-459.

Providing more efficient failover and advertisement of routes is a goal of the BNG. One or more example embodiments provide mechanisms for grouping subscribers to provide more efficient failover for an entire group of subscribers upon a failure within the BNG.

In at least one example embodiment, a method for configuring network access in a control and user plane separation architecture is described. The control and user plane architecture may include a control plan and a user plane. The method may include sending, by a session management function (SMF) to a first user plane function (UPF), a first packet forwarding control protocol (PFCP) message including an indication of a first tunnel internet protocol (IP) address and a designated state for the first UPF and sending, by the SMF to a second UPF, a second PFCP message including the indication of the first tunnel IP address and a designated state for the second UPF. The designated state for the second UPF may be standby and the designated state for the first UPF may be active.

In at least one example embodiment, the first PFCP message and the second PFCP message may further include an association between the first tunnel IP address and a first subscriber group.

In at least one example embodiment, the method may further include establishing, between the SMF and the first UPF, a first PFCP session for a subscriber in the first subscriber group and establishing, for the subscriber in the first subscriber group, a second PFCP session between the SMF and the second UPF upon failure of the first PFCP session.

In at least one example embodiment, the first subscriber group may utilize the first tunnel IP address for network access in both the first PFCP session and the second PFCP session. In at least one example embodiment, the second UPF may be a redundancy for the first UPF for the first PFCP session.

In at least one example embodiment, the method may further include sending, by the SMF to the first UPF, a third PFCP message including an indication of a second tunnel IP address and a second designated state for the first UPF and sending, by the SMF to the second UPF, a fourth PFCP message including the indication of the second tunnel IP address and a second designated state for the second UPF. The second designated state for the second UPF may be standby and the second designated state for the first UPF may be active.

In at least one example embodiment, the third PFCP message and the fourth PFCP message may further include an association between the second tunnel IP address and a second subscriber group.

In at least one example embodiment, the method may further include establishing, between the SMF and the first UPF, a third PFCP session for a subscriber in the second subscriber group and establishing, for the subscriber in the first subscriber group, a fourth PFCP session between the SMF and the second UPF upon failure of the first PFCP session.

In at least one example embodiment, the first PFCP session between the SMF and the first UPF may be independent of the third PFCP session between the SMF and the first UPF and failure of the first PFCP session may be independent of the third PFCP session.

In at least one example embodiment, the first tunnel IP address and the second tunnel IP address may be assigned by the SMF.

In at least one example embodiment, the method may further include monitoring, by the SMF, a status of the first UPF.

In at least one example embodiment, the method may further include updating, by the SMF, the designated state of the second UPF to active in response to the status of the first UPF indicating failure of the first UPF.

In at least one example embodiment, the method may further include maintaining the designated state of the first UPF as active and the designated state for the second UPF as standby in response to the status of the first UPF not indicating failure of the first UPF.

Also described herein is a system for configuring network access in a control and user plane separation architecture is described. The control and user plane architecture may include a control plan and a user plane. The system may include at least one processor and at least one memory storing instructions that, when executed by the at least one processor, cause the system to send, by a session management function (SMF) to a first user plane function (UPF), a first packet forwarding control protocol (PFCP) message including an indication of a first tunnel internet protocol (IP) address and a designated state for the first UPF and send, by the SMF to a second UPF, a second PFCP message including the indication of the first tunnel IP address and a designated state for the second UPF. The designated state for the second UPF may be standby and the designated state for the first UPF may be active.

In at least one example embodiment, the first PFCP message and the second PFCP message may further include an association between the first tunnel IP address and a first subscriber group.

In at least one example embodiment, the instructions, when executed by the at least one processor may be further configured to cause the system to establish, between the SMF and the first UPF, a first PFCP session for a subscriber in the first subscriber group and establish, for the subscriber in the first subscriber group, a second PFCP session between the SMF and the second UPF upon failure of the first PFCP session.

In at least one example embodiment, the first subscriber group may utilize the first tunnel IP address for network access in both the first PFCP session and the second PFCP session. In at least one example embodiment, the second UPF may be a redundancy for the first UPF for the first PFCP session.

In at least one example embodiment, the instructions, when executed by the at least one processor may be further configured to cause the system to send, by the SMF to the first UPF, a third PFCP message including an indication of a second tunnel IP address and a second designated state for the first UPF and send, by the SMF to the second UPF, a fourth PFCP message including the indication of the second tunnel IP address and a second designated state for the second UPF. The second designated state for the second UPF may be standby and the second designated state for the first UPF may be active.

In at least one example embodiment, the third PFCP message and the fourth PFCP message may further include an association between the second tunnel IP address and a second subscriber group.

In at least one example embodiment, the instructions, when executed by the at least one processor may be further configured to cause the system to establish, between the SMF and the first UPF, a third PFCP session for a subscriber in the second subscriber group and establish, for the subscriber in the first subscriber group, a fourth PFCP session between the SMF and the second UPF upon failure of the first PFCP session.

In at least one example embodiment, the first PFCP session between the SMF and the first UPF may be independent of the third PFCP session between the SMF and the first UPF and failure of the first PFCP session may be independent of the third PFCP session.

In at least one example embodiment, the first tunnel IP address and the second tunnel IP address may be assigned by the SMF.

In at least one example embodiment, the instructions, when executed by the at least one processor may be further configured to cause the system to monitor, by the SMF, a status of the first UPF.

In at least one example embodiment, the instructions, when executed by the at least one processor may be further configured to cause the system to update, by the SMF, the designated state of the second UPF to active in response to the status of the first UPF indicating failure of the first UPF.

In at least one example embodiment, the instructions, when executed by the at least one processor may be further configured to cause the system to maintain the designated state of the first UPF as active and the designated state for the second UPF as standby in response to the status of the first UPF not indicating failure of the first UPF.

Also described herein is a non-transitory computer-readable storage medium storing computer-executable instruction that, when executed by the at least one processor of a system, may cause the system to perform a method for configuring network access in a control and user plane separation architecture. The control and user plane separation architecture may include a control plane and a user plane. The method may include sending, by a session management function (SMF) to a first user plane function (UPF), a first packet forwarding control protocol (PFCP) message including an indication of a first tunnel internet protocol (IP) address and a designated state for the first UPF and sending, by the SMF to a second UPF, a second PFCP message including the indication of the first tunnel IP address and a designated state for the second UPF, the designated state for the second UPF being standby and the designated state for the first UPF being active.

At least one other example embodiment provides a network element for configuring network access in a control and user plane separation architecture. The control and user plane separation architecture may include a control plane and a user plane. The network element may include means for sending, by a session management function (SMF) to a first user plane function (UPF), a first packet forwarding control protocol (PFCP) message including an indication of a first tunnel internet protocol (IP) address and a designated state for the first UPF and sending, by the SMF to a second UPF, a second PFCP message including the indication of the first tunnel IP address and a designated state for the second UPF, the designated state for the second UPF being standby and the designated state for the first UPF being active.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
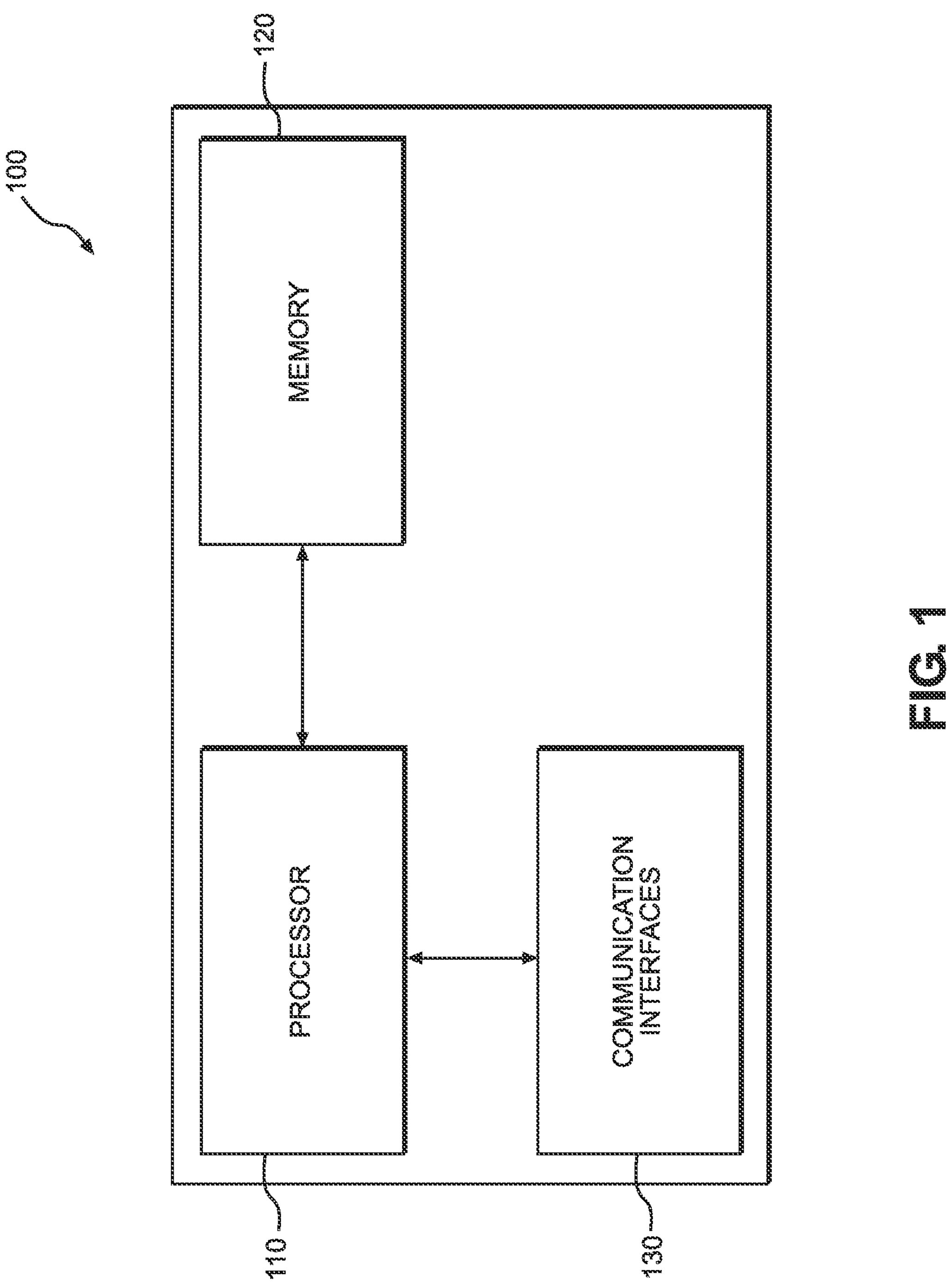
FIG. 1 illustrates an example embodiment of a system that may implement the methods of configuring network access described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network node, Aggregate Gateway Function (AGF) node, residential gateway (RG), server, etc., it should be understood that one or more example embodiments discussed herein may be performed by one or more processors (or processing circuitry) at the applicable device, apparatus, network node, network element, or system. For example, according to one or more example embodiments, at least one memory may store instructions that, when executed by one or more processors, cause the network element/network node, or the like, to perform the operations discussed herein.

As discussed herein, the term "mechanism," in addition to its plain and ordinary meaning, may refer to methods, apparatuses and/or non-transitory computer readable storage mediums where applicable.

As discussed herein, the terminology "one or more" and "at least one" may be used interchangeably.

It will be appreciated that a number of example embodiments may be used in combination.

As discussed herein, the term "subscriber" refers to the purchaser or subscriber of broadband services, and which utilizes a residential gateway (RG) to access the services. The term "user" refers to users of an end user device or customer premises equipment (CPE) that send and receive user traffic through the RG. Although used in this way for the sake of clarity, a user may also be referred to as a subscriber.

As discussed herein, a packet data unit (PDU) session refers to an internet protocol (IP) based PDU session. An IP based PDU session (sometimes referred to as an IP session) refers to an IP connection established between a RG (e.g., a 5$^{th}$ Generation-Residential Gateway (5G-RG)) and a wireless core network, such as a 5GC. A user plane function (UPF) may be a network function that may facilitate a PDU session within a 5GC. A 5GC may be referred to herein as a data network (DN).

Typically, the wireless core network assigns the RG one or more IP addresses to use for transmission and reception of traffic (e.g., data and control traffic). In operation, a RG utilizes the assigned IP address(es) or IP prefix(es) to connect to the Internet (or other data network). In at least some instances, a RG may obtain several different IP addresses/prefixes for each type of service, wherein each represents a different IP Session. IP based PDU sessions include a single IPv4 session, a single IPv6 session or a single dual stack IP session.

In a Control and User Plane Separation in Broadband Network Gateway (CUPS BNG) architecture, a packet forwarding control protocol (PFCP) is used to program traffic forwarding rules from the control plane or control plane function (e.g., Aggregate Gateway Function-Control Plane (AGF-CP)) to the user plane or user plane function (e.g., AGF-User Plane (AGF-UP)) and vice-versa. Each set of traffic forwarding rules that can be used for one or more PDU sessions from a single RG is referred to as a PFCP session.

Generally, the control plane is responsible for maintaining session states and providing instructions to the user plane. The user plane is responsible for moving packets through the system from ingress to egress by following the traffic rules programmed by the control plane, and independently interacting with other nodes in the network through various routing protocols (e.g., Ethernet Virtual Private Network (EVPN), Border Gateway Protocol (BGP), Interior Gateway Protocol (IGP), etc.).

In the context of wireline access to the 5GC, 5G-RGs may be served by the 5GC. A 5G-RG acts as a full 3GPP User Equipment (UE) that is assumed to terminate 3GPP Non-access stratum (NAS) signaling and to support User Equipment Route Selection Policy (URSP) rules sent by the 5GC to the UE.

The PFCP protocol programs the forwarding rules on a per subscriber basis including the queue or policer rate per traffic or forwarding class.

In the context of the above-discussed architecture, IP addresses are also typically assigned to a UPF. Conventionally, however, there is no mechanism to allow a backup UPF to take over a failed IP endpoint with minimal disruption to subscribers. One or more example embodiments provide a mechanism for seamless failover to allow a backup UPF to take over routing for a subscriber group upon failure for the subscriber group at a primary UPF.

FIG. 1 illustrates an example embodiment of a network node 100 at which an AGF may be implemented. The structure shown in FIG. 1 may also be representative of other network elements, such as residential gateways, CPEs, etc.

As shown, the network node 100 includes: a processor 110, a memory 120 connected to the processor 110, and various communication interfaces 130 connected to the processor 110. The various communication interfaces 130 may constitute a transceiver for transmitting/receiving data from/to other network elements (e.g., network functions, data centers, SCPs, etc.). As will be appreciated, depending on the implementation of the system 100, the network node 100 may include many more components than those shown in FIG. 1. However, it is not necessary that all of these generally conventional components be shown in order to disclose the illustrative example embodiment. For example purposes, the example embodiment shown in FIG. 1 will be discussed with regard to the processor 110. However, it should be understood that the network node 100 shown in FIG. 1 may include one or more processors or other processing circuitry, such as one or more Application Specific Integrated Circuits (ASICs).

The memory 120 may be a computer readable storage medium that generally includes a random access memory (RAM), read only memory (ROM), and/or a permanent mass storage device, such as a disk drive. The memory 120 may also store an operating system and any other routines/modules/applications for providing the functionalities of the network node 100 (including UPF, CPF, MPF, etc.) to be executed by the processor 110. These software components may also be loaded from a separate computer readable storage medium into the memory 120 using a drive mechanism (not shown). Such separate computer readable storage medium may include a disc, tape, DVD/CD-ROM drive, memory card, or other like computer readable storage medium (not shown). In some example embodiments, software components may be loaded into the memory 120 via one of the various communication interfaces 130, rather than via a computer readable storage medium.

The processor 110 or other processing circuitry may be configured to carry out instructions of a computer program by performing the arithmetical, logical, and input/output operations of the system. Instructions may be provided to the processor 110 by the memory 120.

The various communication interfaces 130 may be wired and may include components that interface the processor 110 with the other input/output components. As will be understood, the various communication interfaces 130 and programs stored in the memory 120 to set forth the special purpose functionalities of the system 100 will vary depending on the implementation of the network node.

The various communication interfaces 130 may also include one or more user input devices (e.g., a keyboard, a keypad, a mouse, or the like) and user output devices (e.g., a display, a speaker, or the like).

Figure 2:
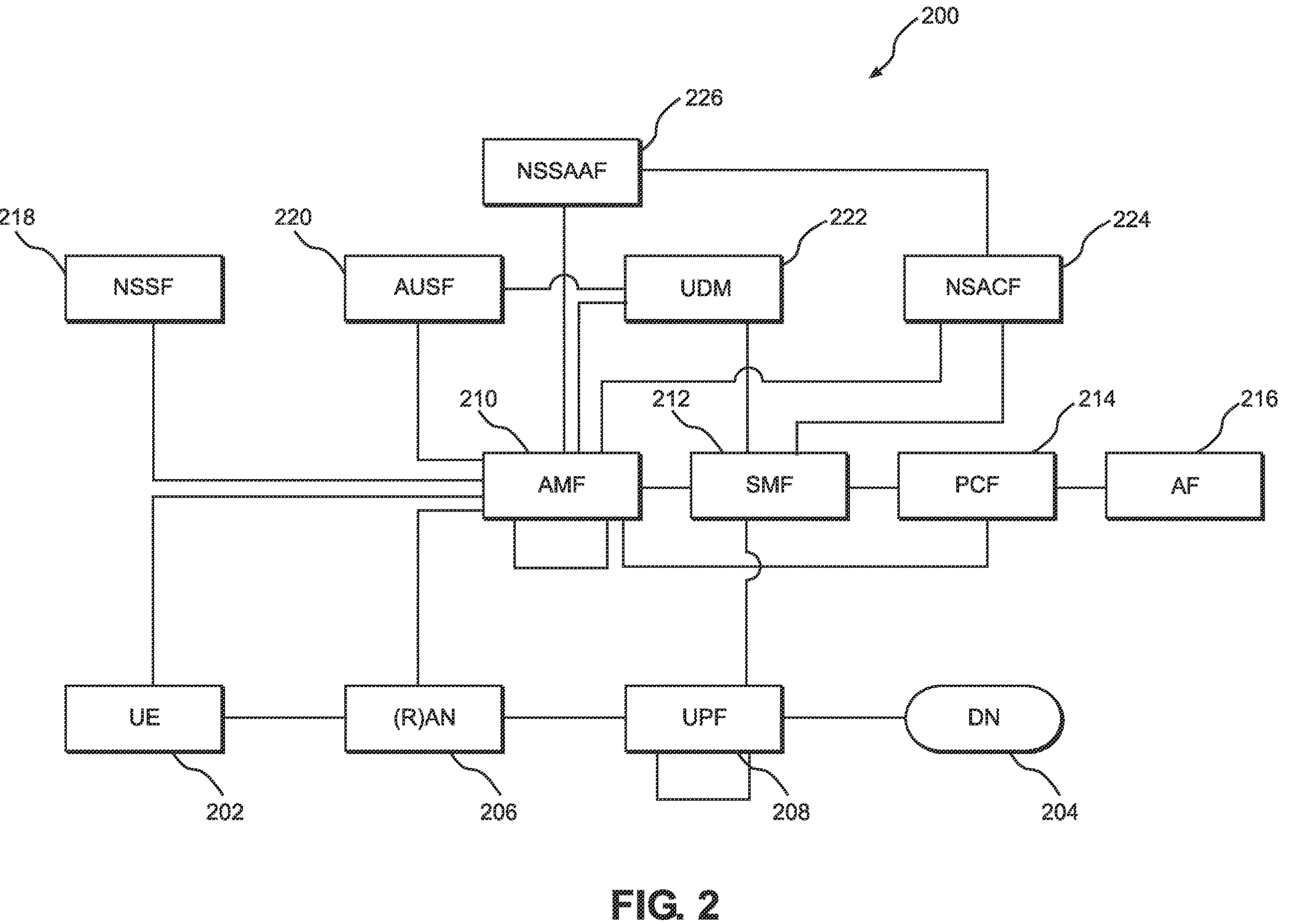
FIG. 2 is a block diagram illustrating a system architecture for wireless core network access, according to example embodiments.

FIG. 2 is an example embodiment of a system architecture 200. In at least one example embodiment, the system architecture 200 may be a 5G system architecture. The system architecture 200 incorporates a CUPS BNG architecture.

The system architecture 200 includes at least one UE 202 which is configured to be connected with a data network (DN) 204 such as the Internet via one or more elements of the system architecture 200. The UE 202 may be an RG as described above. The UE 202 may be a hardware device or equipment typically located at the home or business of a customer. The UE 202 may facilitate connection to a network by one or more end user devices that may include terminals or electronic devices such as mobile phones, laptops, computers, tablets, wireless (e.g., WiFi) access points, wireless network (e.g., WiFi) extenders, fixed wireless access units, Small Cell devices, or the like.

The system architecture 200 may further include at least one access network (AN) 206, which may be a Radio Access Network (RAN), at least one user plane function (UPF) 208, an access and mobility management function (AMF) 210, a session management function (SMF) 212, a point coordination function (PCF) 214, an application function (AF) 216, a network slice selection function (NSSF) 218, an authentication server function (AUSF) 220, a unified data management (UDM) 222, a network slice admission control function (NSACF) 224, and a network slice-specific authentication and authorization function (NSSAAF) 226.

The AN 206 may include one or more of a Next Generation Radio Access Network (NG-RAN) or a Wireline Access Network.

Although only one (R)AN and one UPF is shown in FIG. 2, example embodiments should not be limited to this example. Rather, any number of (R)AN s and UPFs may be included in the system architecture 200.

Each of the elements of the system architecture 200 may interact with one or more additional elements of the system architecture 200 as shown by the connections between the elements of the system architecture 200.

The UPF 208 connects the UE 202 to the DN 204 through the (R)AN 206. The UPF 208 registers and authenticates with the (R)AN 206 through the use of standard mobile 3GPP procedures. The UPF 208 processes control messages (e.g., 3GPP NAS messages) from the (R)AN 206. The UPF 208 may support multiple services, such as IPTV. In some embodiments, IPTV can be defined as multimedia services, such as television, video, audio, textual media, graphics, data, combinations thereof, and/or the like that are delivered over IP-based networks supporting the required level of QoS, Quality of Experience (QoE), security, interactivity, reliability, or the like.

Additional detail of the elements of the system architecture 200 are well-known in the art and are not included herein.

The example embodiments described herein may be described with reference to a CUPS BNG architecture. However, the example embodiments herein are also applicable to a AGF CUPS architecture. For example, the SMF 212 may include a BNG-CP function and an AGF-CP function while the UPF 208 may include a BNG-UP function and an AGF-UP function. The AGF-CP may program the AGF-UP via the PFCP protocol to facilitate network access by a 5G-RG to a 5GC such as the DN described above.

Figure 3:
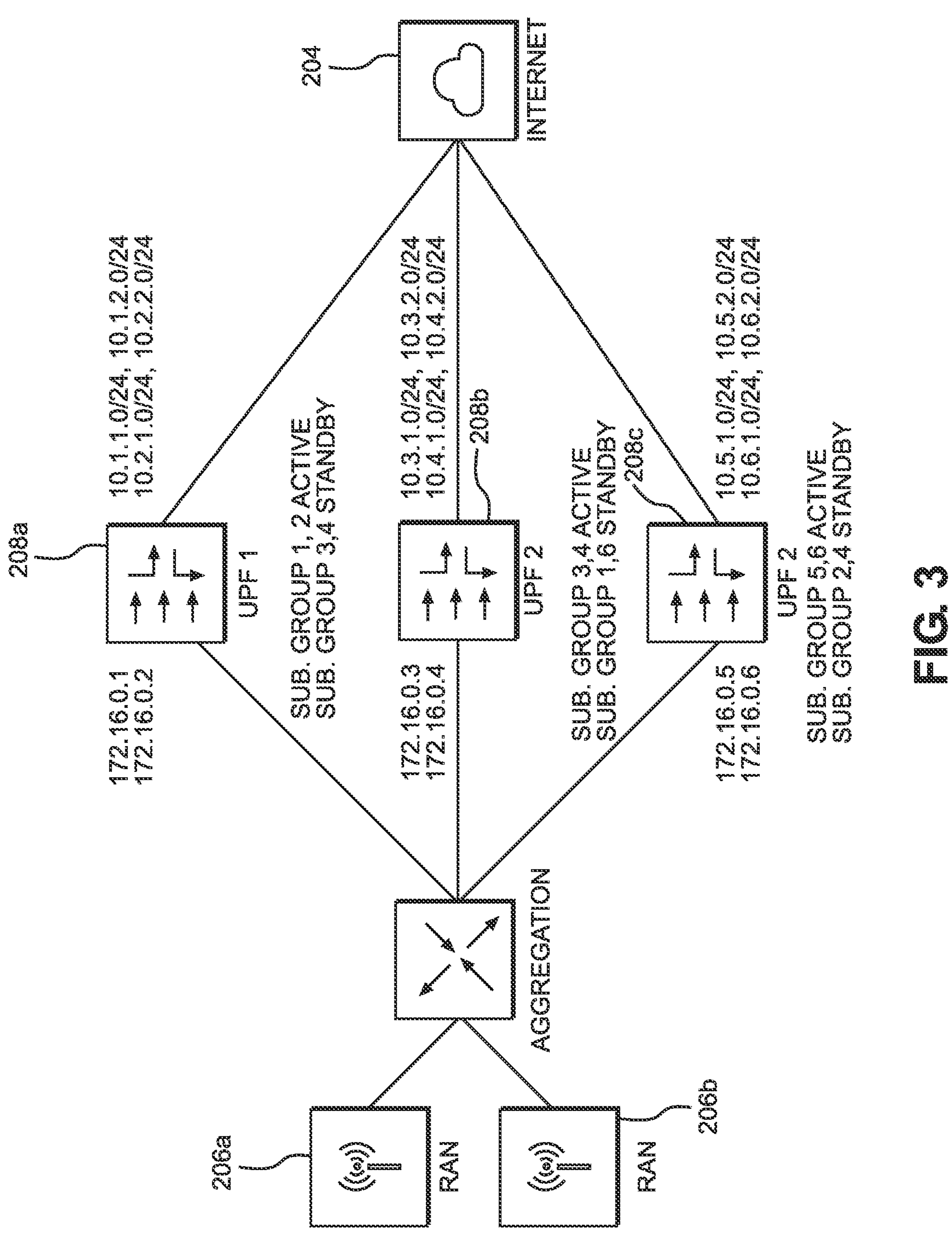
FIG. 3 is a block diagram illustrating a portion of the system architecture of FIG. 2, according to example embodiments.

FIG. 3 is a block diagram illustrating a portion of the system architecture 200 of FIG. 2, according to example embodiments. The (R)AN 206 may include a first (R)AN 206*a* and a second (R)AN 206*b*. The UPF 208 may include a first UPF 208*a*, a second UPF 208*b*, and a third UPF 208*c*. Each of the first UPF 208*a*, the second UPF 208*b*, and the third UPF 208*c* may be configured to connect a user device such as the UE 202 to the DN 204 through the first (R)AN 206*a* and/or the second (R)AN 206*b*.

In at least one example embodiment, the first UPF 208*a* may be configured to route traffic from at least one of the first (R)AN 206*a* or the second (R)AN 206*b* to the DN 204 for a first subscriber group and a second subscriber group. The second UPF 208*b* may be configured to route traffic from at least one of the first (R)AN 206*a* or the second (R)AN 206*b* to the DN 204 for a third subscriber group and a fourth subscriber group. The third UPF 208*c* may be configured to route traffic from at least one of the first (R)AN 206*a* or the second (R)AN 206*b* to the DN 204 for a fifth subscriber group and a sixth subscriber group. As used herein, a subscriber group is a grouping of subscribers at a point within a network such as a network node. In at least one example embodiment, subscribers may be grouped based on quality of service parameters or a service level of the subscriber. A BBF subscriber group, SGRP, may be an example of a subscriber group as described herein.

In at least one example embodiment, the first UPF 208*a* may additionally be configured as a standby UPF to route traffic from at least one of the first (R)AN 206*a* or the second (R)AN 206*b* to the DN 204 for the third subscriber group and the fifth subscriber group. The second UPF 208*b* may additionally be configured as a standby UPF to route traffic from at least one of the first (R)AN 206*a* or the second (R)AN 206*b* to the DN 204 for the first subscriber group and the sixth subscriber group. The third UPF 208*c* may additionally be configured as a standby UPF to route traffic from at least one of the first (R)AN 206*a* or the second (R)AN 206*b* to the DN 204 for the second subscriber group and the fourth subscriber group.

In at least one example embodiment, the SMF 212 may be configured to create each of the first subscriber group, the second subscriber group, the third subscriber group, the fourth subscriber group, the fifth subscriber group, and/or the sixth subscriber group. The SMF 212 may then assign prefixes to each subscriber group. The prefixes may be used to associate a subscriber with a particular subscriber group as they are logging in to a network. For example, a first subscriber may be associated with the first subscriber group and may be assigned a subscriber address from prefix 10.1.1.0/24 and 10.1.2.0/24. A second subscriber may be associated with the second subscriber group and may be assigned a subscriber address from prefix 10.2.1.0/24 and 10.2.2.0/24. A third subscriber may be associated with the third subscriber group and may be assigned a subscriber address from prefix 10.3.1.0/24 and 10.3.2.0/24. A fourth subscriber may be associated with the fourth subscriber group and may be assigned a subscriber address from prefix 10.4.1.0/24 and 10.4.2.0/24. A fifth subscriber may be associated with the fifth subscriber group and may be assigned a subscriber address from prefix 10.5.1.0/24 and 10.5.2.0/24. A sixth subscriber may be associated with the sixth subscriber group may be assigned a subscriber address from prefix 10.6.1.0/24 and 10.6.2.0/24.

Additionally, the first subscriber group may be assigned an endpoint IP address of 172.16.0.1. The endpoint IP address may be referred to herein as a tunnel IP address. The second subscriber group may be assigned an endpoint IP address of 172.06.0.2. The third subscriber group may be assigned an endpoint IP address of 172.06.0.3. The fourth subscriber group may be assigned an endpoint IP address of 172.06.0.4. The fifth subscriber group may be assigned an endpoint IP address of 172.06.0.5. The sixth subscriber group may be assigned an endpoint IP address of 172.06.0.6.

In at least one example embodiment, the endpoint IP addresses for each of the subscriber groups may be assigned by the SMF 212. In particular, the SMF 212 may send a PFCP message to at least one of the first UPF 208*a*, the second UPF 208*b*, or the third UPF 208*c* that includes an indication of a tunnel IP address and a designated state for the at least one of the first UPF 208*a*, the second UPF 208*b*, or the third UPF 208*c*. In addition to the indication of the tunnel IP address and the designated state, a PFCP message from the SMF 212 may include an association between the tunnel IP address and a subscriber group. An association between a tunnel IP address and a subscriber group may be an assignment of the tunnel IP address to the subscriber group.

For example, the SMF 212 may send a first PFCP message to the first UPF 208*a* that includes an indication of a first tunnel IP address, a designated state for the first UPF 208*a* as being active, and an association between the first tunnel IP address and the first subscriber group. In at least one example embodiment, the indication of the first tunnel IP address may be or may point to the endpoint IP address that is assigned to the first subscriber group. The SMF 212 may also send a second PFCP message to the second UPF 208*b* that includes the indication of the first tunnel IP address, a designated state for the second UPF 208*b* as being standby, and an association between the first tunnel IP address and the first subscriber group. Thus, the second UPF 208*b* may become a backup UPF or may be a redundancy for the first UPF 208*a*.

The SMF 212 may send similar PFCP messages to each of the first UPF 208*a*, the second UPF 208*b*, and the third UPF 208*c* for the second subscriber group, the third subscriber group, the fourth subscriber group, the fifth subscriber group, and the sixth subscriber group such that one of the UPFs is designated as being in an active state for each subscriber group and at least one of the UPFs is designated as being in a standby state for each subscriber group. Thus, each of the subscriber groups has a primary UPF and a (or at least one) backup UPF to route traffic from at least one of the first (R)AN 206*a* or the second (R)AN 206*b* to the DN 204.

Once the SMF 212 has sent the PFCP messages to the UPFs, the SMF 212 may establish, between the SMF 212 and one of the first UPF 208*a*, the second UPF 208*b*, or the third UPF 208*c*, a first PFCP session for a subscriber. For example, if the subscriber is assigned to the first subscriber group, the SMF 212 may establish a first PFCP session between the SMF 212 and the first UPF 208*a* for the subscriber. The SMF 212 may additionally establish a second PFCP session between the SMF 212 and a UPF different from a first designated UPF upon failure of the first designated UPF. For example, for the subscriber in the first subscriber group, if the first PCFP session for the subscriber fails, the SMF 212 may establish a second PFCP session between the SMF 212 and the second UPF 208*b*.

Because the tunnel IP addresses are associated with subscriber groups, if there is a failure at a point in the system architecture 200 that impacts a PFCP session of one subscriber group of the first UPF 208*a*, any other PFCP session for another subscriber group that is routed via the first UPF 208*a* may be unaffected which may cause less disturbance for subscribers within the system architecture 200. For example, if a first subscriber group includes subscribers from the first (R)AN 206*a* and a second subscriber group includes subscribers from the second (R)AN 206*b* and both the first subscriber group and the second subscriber group utilize the first UPF 208*s*, upon a failure that does not allow the first (R)AN 206*a* to route traffic for a PFCP session of a first subscriber group via the first UPF 208*a*, a PFCP session of a second subscriber group may be unaffected and uninterrupted such that the first UPF 208*a* may continue to route traffic for the PFCP session of the second subscriber group. Thus, the PFCP session of the first subscriber group may be rolled over to a backup UPF such as the second UPF 208*b* without a change in the UPF for the PFCP session of the second subscriber group.

This failover process allows a subscriber group to utilize one tunnel IP address for network access for both a first PFCP session via a first UPF and a second PFCP session via a second UPF.

Figure 4:
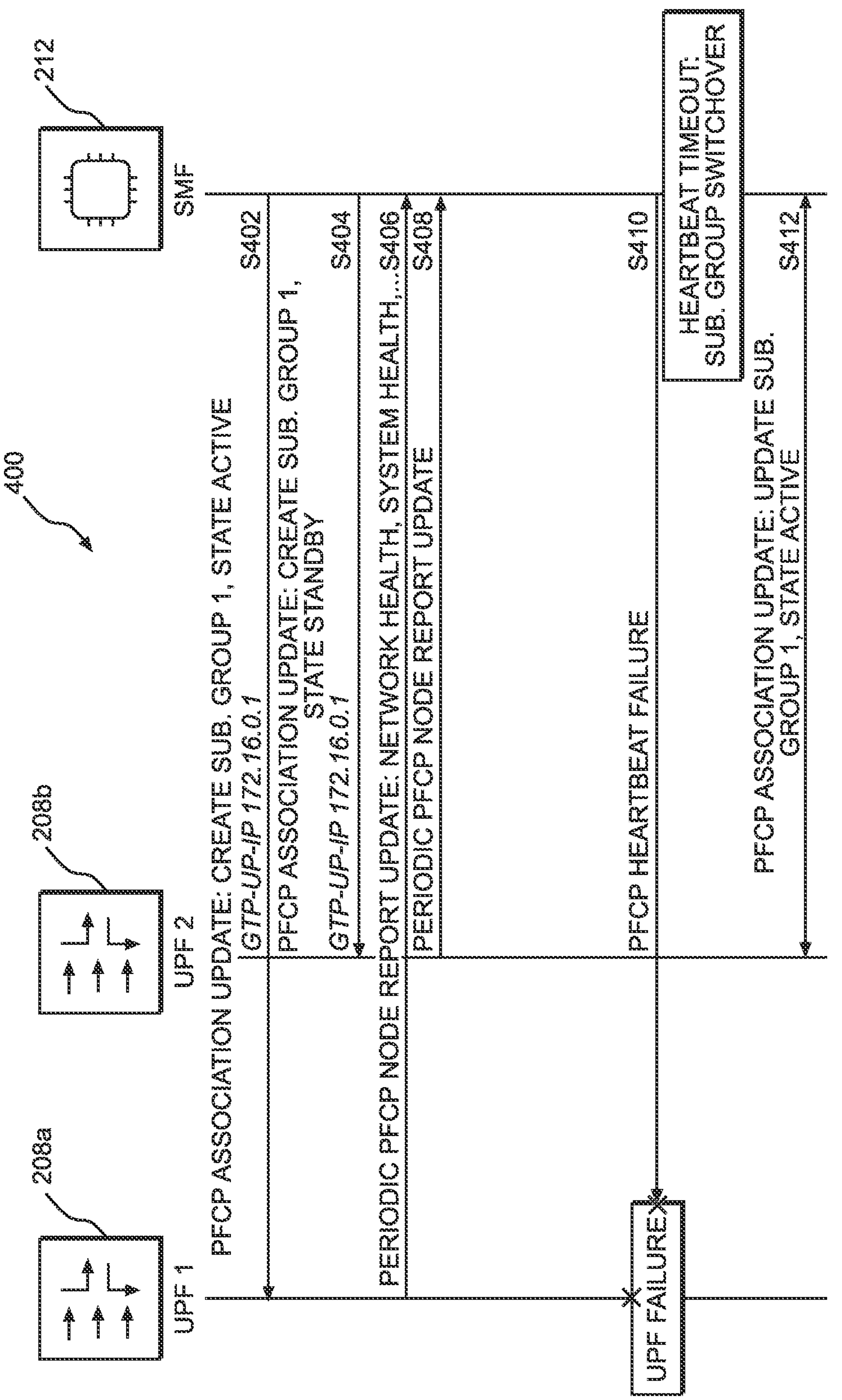
FIG. 4 is a signal flow diagram illustrating a method for communicating packet forwarding control protocol (PFCP) messages and monitoring a status of a system architecture according to example embodiments.

FIG. 4 is a signal flow diagram 400 illustrating a method for communicating PFCP messages and monitoring a status of the system architecture 200, according to example embodiments. For example purposes, the example embodiment shown in FIG. 4 will be discussed with regard to the architecture shown in FIGS. 2 and 3. It should be understood, however, that example embodiments should not be limited to this example.

At S402 the SMF 212 may send a first PFCP message to the first UPF 208*a*. The first PFCP message may include an indication of a first tunnel IP address and a designated state for the first UPF 208*a*. As described above, the first PFCP message may also include an association between the first tunnel IP address and a first subscriber group. The designated state for the first UPF 208*a* for the first subscriber group may be active.

The SMF 212 may then send, at S404, a second PFCP message to the second UPF 208*b*. The second PFCP message may include the indication of the first tunnel IP address and a designated state for the second UPF 208*a*. The second PFCP message may also include an association between the first tunnel IP address and the first subscriber group. The designated state for the second UPF 208*b* for the first subscriber group may be standby.

The SMF 212 may send the second PFCP message after sending the first PFCP message or may send the second PFCP message simultaneously or concurrently with the first PFCP message.

After the first PFCP message and the second PFCP messages have been sent, the first UPF 208*a* and the second UPF 208*b* may periodically send node report messages to the SMF 212 at S406 and S408. The periodic node report messages may include reports directed to network health and/or system health of the system architecture 200. For example, the periodic node report messages may include an indication that an access facing logical port has failed or that a network routing error to an interface has occurred. If either an access facing logical port has failed or if there is a network routing failure, the first UPF 208*a* may have failed.

Additionally, the SMF 212 may send periodic heartbeat messages (heartbeats) to at least the first UPF 208*a* at S410. The periodic heartbeats may be sent to the UPF that is in an active state to confirm that the UPF is active. A heartbeat timeout may occur if more than a threshold amount of time has passed from sending the periodic heartbeat and receiving a heartbeat response from the first UPF 208*a*. If more than the threshold amount of time has passed, the first UPF 208*a* may have failed.

In at least one example embodiment, the heartbeat timeout and the threshold amount of time may be configurable. For example, the threshold amount of time may be five seconds and a fault may be declared after three consecutive a heartbeat timeouts without receipt of a heartbeat response. In another example embodiment, the threshold amount of time may be one second and a fault may be declared after two consecutive heartbeat timeouts without receipt of a heartbeat response, or the threshold amount of time may be sixty seconds and a fault may be declared if the heartbeat response is missed five times in a row. Because the heartbeat timeout and the threshold amount of time are configurable, different threshold amounts of time and numbers of missed heartbeat responses (heartbeat timeouts) may be used to declare a fault.

When either the periodic node report message or the heartbeat indicates a failure of the first UPF 208*a*, the SMF 212, at S412, may send an update PFCP message to change the designated state of the second UPF 208*b* to active. If no failure of the first UPF 208*a* is detected, then the designated states of both the first UPF 208*a* and the second UPF 208*b* may not be adjusted.

Figure 5:
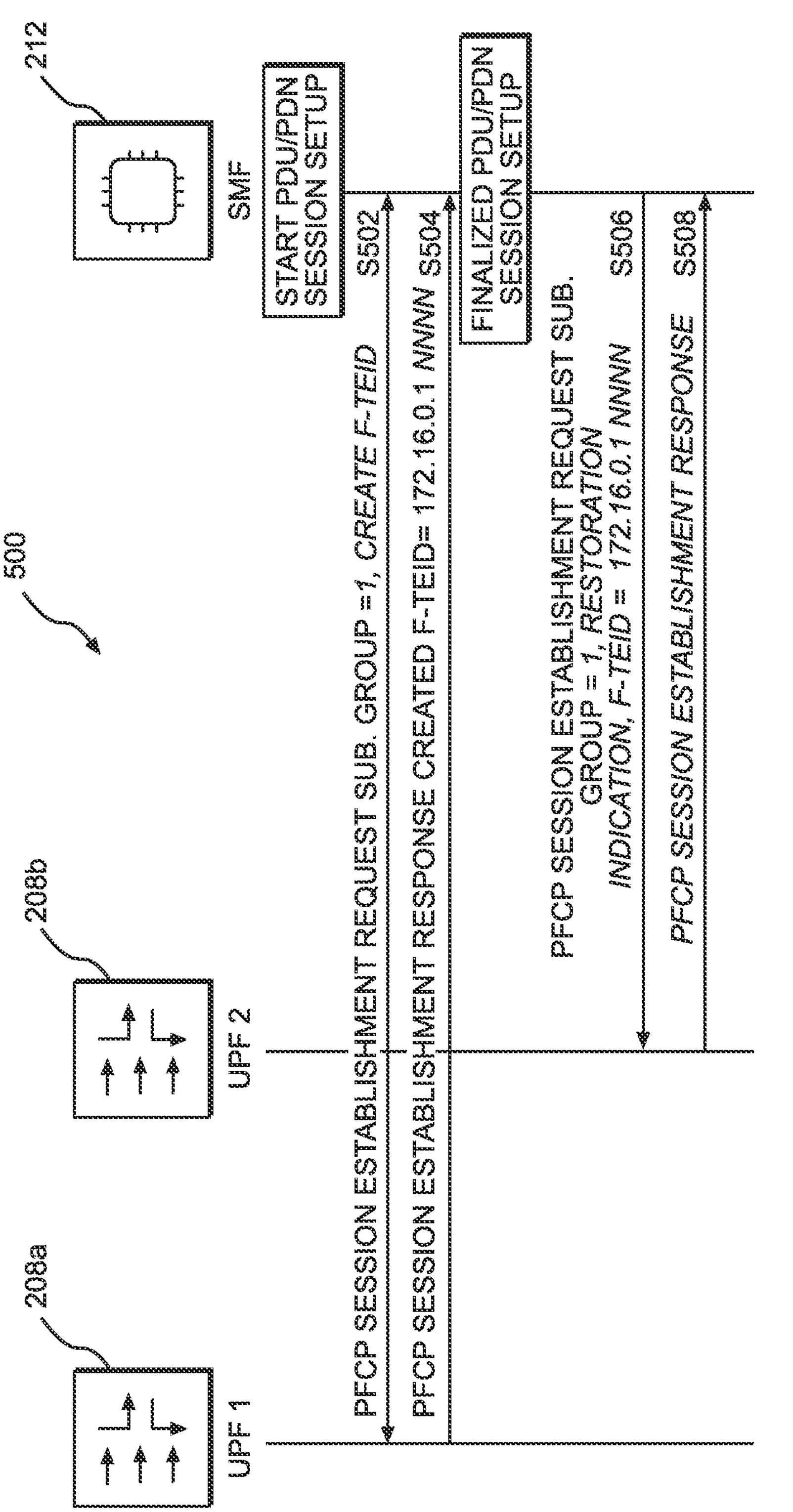
FIG. 5 is a signal flow diagram illustrating a method of configuring network access in a system architecture according to example embodiments.

FIG. 5 is a signal flow diagram 500 illustrating a method for configuring network access in a system architecture, according to example embodiments. For example purposes, the example embodiment shown in FIG. 5 will be discussed with regard to the architecture shown in FIGS. 2 and 3. It should be understood, however, that example embodiments should not be limited to this example.

The signal flow diagram 500 may occur subsequent to at least steps S402 and S404 of the signal flow diagram 400.

At S502, the SMF 212 may send a PFCP session establishment request to the first UPF 208*a*. At S504, the first UPF 208*a* may send a PFCP session establishment response to the SMF 212. The session establishment request and response may establish, between the SMF 212 and the first UPF 208*a*, a first PFCP session for a subscriber in a first subscriber group. The first PFCP session may utilize the first tunnel IP address that is associated with the first subscriber group as established at S402 of FIG. 4.

At S506, the SMF 212 may send a PFCP session establishment request to the second UPF 208*b*. The PFCP session establishment request sent to the second UPF 208*b* may be a restoration indication. This may indicate that there was a failure of the first PFCP session at the first UPF 208*a*, and the first subscriber group is rolling over to the second UPF 208*b* utilizing the first tunnel IP address that is associated with the first subscriber group.

At S508, the second UPF 208*b* may send a PFCP session establishment response to the SMF 212. The session establishment request and response may establish, between the SMF 212 and the second UPF 208*a*, a second PFCP session for a subscriber in a first subscriber group. The second PFCP session may be established upon failure of the first PFCP session via the first UPF 208*a*.

The systems and methods described herein are configured to provide a failover between two UPFs to reduce interruption to subscribers upon failures within a network. By assigning IP addresses to subscriber groups, individual subscriber groups are able to be rolled over upon failure to a component of a system architecture that impacts that individual subscriber group without impacting or adjusting other, nonimpacted subscriber groups. These systems and methods provide improved network access for subscribers within a system architecture.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, BNGs, servers, ANs, CPEs, routers, or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network nodes, BNGs, servers, ANs, CPEs, routers, or other network elements, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for configuring network access in a control and user plane separation architecture, the control and user plane separation architecture including a control plane and a user plane, the method comprising:

sending, by a session management function (SMF) to a first user plane function (UPF), a first packet forwarding control protocol (PFCP) message including an indication of a first tunnel internet protocol (IP) address and a designated state for the first UPF;

sending, by the SMF to a second UPF, a second PFCP message including the indication of the first tunnel IP address and a designated state for the second UPF, the designated state for the second UPF being standby and the designated state for the first UPF being active;

sending, by the SMF to the first UPF, a third PFCP message including an indication of a second tunnel IP address and a second designated state for the first UPF; and sending, by the SMF to the second UPF, a fourth PFCP message including the indication of the second tunnel IP address and a second designated state for the second UPF, the second designated state for the second UPF being standby and the second designated state for the first UPF being active.

2. The method of claim 1, wherein the first PFCP message and the second PFCP message further include an association between the first tunnel IP address and a first subscriber group.

3. The method of claim 2, further comprising:

establishing, between the SMF and the first UPF, a first PFCP session for a subscriber in the first subscriber group, and establishing, for the subscriber in the first subscriber group, a second PFCP session between the SMF and the second UPF upon failure of the first PFCP session.

4. The method of claim 3, wherein the first subscriber group utilizes the first tunnel IP address for network access in both the first PFCP session and the second PFCP session.

5. The method of claim 3, wherein the second UPF is a redundancy for the first UPF for the first PFCP session.

6. The method of claim 1, further comprising:

monitoring, by the SMF, a status of the first UPF.

7. The method of claim 6, further comprising:

updating, by the SMF, the designated state of the second UPF to active in response to the status of the first UPF indicating failure of the first UPF.

8. A system for configuring network access in a control and user plane separation architecture, the control and user plane separation architecture including a control plane and a user plane, the system comprising:

at least one processor; and at least one memory storing instructions that, when executed by the at least one processor, cause the system to send, by a session management function (SMF) to a first user plane function (UPF), a first packet forwarding control protocol (PFCP) message including an indication of a first tunnel internet protocol (IP) address and a designated state for the first UPF;

send, by the SMF to a second UPF, a second PFCP message including the indication of the first tunnel IP address and a designated state for the second UPF, the designated state for the second UPF being standby and the designated state for the first UPF being active;

send, by the SMF to the first UPF, a third PFCP message including an indication of a second tunnel IP address and a second designated state for the first UPF; and send, by the SMF to the second UPF, a fourth PFCP message including the indication of the second tunnel IP address and a second designated state for the second UPF, the second designated state for the second UPF being standby and the second designated state for the first UPF being active.

9. The system of claim 8, wherein the first PFCP message and the second PFCP message further include an association between the first tunnel IP address and a first subscriber group.

10. The system of claim 9, wherein the instructions, when executed by the at least one processor are further configured to cause the system to:

establish, between the SMF and the first UPF, a first PFCP session for a subscriber in the first subscriber group, and establish, for the subscriber in the first subscriber group, a second PFCP session between the SMF and the second UPF upon failure of the first PFCP session.

11. The system of claim 10, wherein the first subscriber group utilizes the first tunnel IP address for network access in both the first PFCP session and the second PFCP session.

12. The system of claim 10, wherein the second UPF is a redundancy for the first UPF for the first PFCP session.

13. The system of claim 10, wherein the third PFCP message and the fourth PFCP message further include an association between the second tunnel IP address and a second subscriber group.

14. The system of claim 13, wherein the instructions, when executed by the at least one processor are further configured to cause the system to:

establish, between the SMF and the first UPF, a third PFCP session for a subscriber in the second subscriber group, and establish, for the subscriber in the first subscriber group, a fourth PFCP session between the SMF and the second UPF upon failure of the first PFCP session.

15. The system of claim 14, wherein the first PFCP session between the SMF and the first UPF is independent of the third PFCP session between the SMF and the first UPF and failure of the first PFCP session is independent of the third PFCP session.

16. The system of claim 10, wherein the first tunnel IP address and the second tunnel IP address are assigned by the SMF.

17. The system of claim 8, wherein the instructions, when executed by the at least one processor are further configured to:

monitor, by the SMF, a status of the first UPF.

18. The system of claim 17, wherein the instructions, when executed by the at least one processor are further configured to cause the system to:

update, by the SMF, the designated state of the second UPF to active in response to the status of the first UPF indicating failure of the first UPF.

19. The system of claim 17, wherein the instructions, when executed by the at least one processor are further configured to cause the system to:

maintain the designated state of the first UPF as active and the designated state for the second UPF as standby in response to the status of the first UPF not indicating failure of the first UPF.

* * * * *